(12) United States Patent
Yasuda et al.

(10) Patent No.: US 12,514,241 B2
(45) Date of Patent: Jan. 6, 2026

(54) LINE LENGTH MEASURING DEVICE AND FISHING REEL COMPRISING THE SAME

(71) Applicant: GLOBERIDE, Inc., Tokyo (JP)

(72) Inventors: Hiromu Yasuda, Tokyo (JP); Motohiro Nonogaki, Tokyo (JP); Kazumasa Ishihara, Tokyo (JP)

(73) Assignee: GLOBERIDE, Inc., Tokyo (JP)

( * ) Notice: Subject to any disclaimer, the term of this patent is extended or adjusted under 35 U.S.C. 154(b) by 229 days.

(21) Appl. No.: 18/238,324

(22) Filed: Aug. 25, 2023

(65) Prior Publication Data
US 2024/0164358 A1  May 23, 2024

(30) Foreign Application Priority Data
Nov. 17, 2022  (JP) .................................. 2022-183823

(51) Int. Cl.
*A01K 89/015* (2006.01)
(52) U.S. Cl.
CPC ................................ *A01K 89/0178* (2015.05)
(58) Field of Classification Search
CPC .... A01K 91/20; A01K 89/015; A01K 89/033; A01K 89/00; A01K 89/0178; A01K 89/01931; G01B 21/06; G01B 21/065; G01B 7/046; G01B 7/042; G01B 7/04
See application file for complete search history.

(56) References Cited

U.S. PATENT DOCUMENTS

| | | | | |
|---|---|---|---|---|
| 4,620,371 A | * | 11/1986 | Murakami | A01K 91/20 33/720 |
| 4,697,758 A | * | 10/1987 | Hirose | A01K 89/015 242/223 |
| 5,363,565 A | * | 11/1994 | Kaneko | A01K 91/20 242/395 |

(Continued)

FOREIGN PATENT DOCUMENTS

| | | |
|---|---|---|
| CN | 203290093 U | 11/2013 |
| JP | S48-91190 U | 11/1973 |

(Continued)

OTHER PUBLICATIONS

Mar. 12, 2024 Office Action Issued in Taiwanese Patent Application No. 112126506.
(Continued)

*Primary Examiner* — Anna M Momper
*Assistant Examiner* — Henrix Soto
(74) *Attorney, Agent, or Firm* — Oliff PLC

(57) ABSTRACT

A line length measuring device that is capable of measuring a line length of a fishing line reeled out from a spool of a fishing reel and includes: a rotation detector capable of detecting a number of revolutions of the spool relative to a reel main body; a line length calculator that calculates a line length of the reeled out fishing line from the number of revolutions detected by the rotation detector; and a fishing line information setting part that sets fishing line information for the calculation of the line length of the reeled out fishing line by the line length calculator, the fishing line information (Continued)

setting part being configured to enable input of a type of a fishing line to be wound and a line winding diameter (Dmax) of the spool after winding of the fishing line to be wound.

5 Claims, 14 Drawing Sheets

(56) References Cited

U.S. PATENT DOCUMENTS

| | | | | |
|---|---|---|---|---|
| 5,395,065 | A * | 3/1995 | Hirose | A01K 89/015 |
| | | | | 242/223 |
| 5,833,154 | A * | 11/1998 | Kaneko | G01B 21/06 |
| | | | | 242/223 |
| 5,887,811 | A * | 3/1999 | Tsutumi | A01K 91/20 |
| | | | | 116/299 |
| 6,056,218 | A * | 5/2000 | Nanbu | A01K 89/015 |
| | | | | 33/708 |
| 6,561,033 | B2 * | 5/2003 | Nanbu | G01S 15/88 |
| | | | | 242/223 |
| 7,775,471 | B2 * | 8/2010 | Kitajima | A01K 89/01931 |
| | | | | 242/614.1 |

FOREIGN PATENT DOCUMENTS

| | | | |
|---|---|---|---|
| JP | S5811170 Y2 * | 3/1983 | |
| JP | S5811171 Y2 * | 3/1983 | |
| JP | 58154609 A * | 9/1983 | |
| JP | H01276011 A | 11/1989 | |
| JP | 04091676 U | 8/1992 | |
| JP | H08256651 A | 10/1996 | |
| JP | H0923792 A * | 1/1997 | |
| JP | H1028500 A * | 2/1998 | |
| JP | 10150890 A * | 6/1998 | |
| JP | 10191848 A * | 7/1998 | |
| JP | 2905818 B2 * | 6/1999 | |
| JP | H11225632 A | 8/1999 | |
| JP | H11325875 A | 11/1999 | |
| JP | 2001095436 A * | 4/2001 | |
| JP | 2002065127 A | 3/2002 | |
| JP | 2007143475 A * | 6/2007 | |
| JP | 2011097831 A * | 5/2011 | ............. A01K 89/01 |
| JP | 2011139646 A | 7/2011 | |
| JP | 2013048594 A | 3/2013 | |
| KR | 10-2022-0136077 A | 10/2022 | |
| TW | 356656 U | 4/1999 | |

OTHER PUBLICATIONS

Aug. 26, 2025 Office Action issued in Japanese Patent Application No. 2022-183823.

Aug. 27, 2025 Office Action issued in Korean Patent Application No. 10-2023-0138703.

* cited by examiner

LINE TYPE ○ NYLON NO. 2  ● NYLON NO. 3  ○ NYLON NO. 4
○ PE NO. 1  ○ PE NO. 1.5  ○ PE NO. 2

○ 50%/82m   ○ 60%/103m   ○ 70%/125m

○ 80%/149m   ● 90%/174m   ○ 100%/200m

LINE LENGTH MEASURING DEVICE AND FISHING REEL COMPRISING THE SAME

CROSS-REFERENCE TO RELATED APPLICATION

This application claims priority under 35 U.S.C. § 119 to Japanese Patent Application No. 2022-183823 filed on Nov. 17, 2022 in the Japanese Patent Office, the entire contents of each hereby incorporated by reference

FIELD

The present invention relates to a line length measuring device, particularly to a line length measuring device for calculating a line length of a reeled out fishing line and a fishing reel comprising the same.

BACKGROUND

Conventionally, a technique of detecting a length of a reeled out fishing line by detecting the number of revolutions of a spool has been known.

JP H11-225632 A discloses a line length measuring device of a fishing reel for measuring a length of a fishing line, fed out from a spool of the fishing reel or wound around the spool, the line length measuring device of the fishing reel including: a rotational position data detection means that detects rotational position data of the spool; a relationship learning means that learns a first relationship between a predetermined length of a fishing line at a substantially final winding portion when the fishing line is wound around the spool and a detection result of the rotational position data detection means; a relationship calculator that obtains a second relationship between a line length per means rotation of the spool and the rotational position data based on the first relationship; and a line length calculator that obtains a length of the fishing line based on the rotational position data detected by the rotational position data detection means and the second relationship calculated by the relationship calculator.

SUMMARY

A line winding diameter of a fishing line wound around a spool decreases as the fishing line is reeled out, and increases as the fishing line is wound. It has been found that, when a line winding diameter change $\Delta D$ of the fishing line wound around the spool can be regarded to be constant, a relationship between the number of revolutions N of the spool and a release distance L of the line is obtained as a relational expression of a quadratic function represented by $L=(AX^2+BN)$ (where A and B are predetermined constants).

The constants A and B are determined at a stage where specifications of a fishing reel, such as a shape of a spool, is determined, or are determined at a stage of winding a fishing line, such as a thickness of the fishing line, a length of the wound fishing line, and the presence or absence of pre-winding. As a method of calculating the constants A and B, a method of inputting the relationship between the release distance L of the fishing line and the number of revolutions N of the spool at the time of winding the fishing line to perform actual measurement and calculating A and B from the relationship, and a method of allowing a user to select from preset values stored in the fishing reel can be considered. However, there is a problem that it takes time and effort to perform the actual measurement, and it is not possible to perform the input unless the length of the wound fishing line is known, so that it takes time and effort to cope with high breakage and to cope with the pre-winding.

The present invention has been made in view of the above circumstances, and an object thereof is to provide a line length measuring device, which realizes a line length setting method capable of coping with pre-winding and high breakage without requiring an input of a length of a wound fishing line, and a fishing reel comprising the same. Purposes of the present invention other than this object will be clarified by referring to the overall description disclosed herein.

A line length measuring device according to one embodiment of the present invention is a line length measuring device capable of measuring a line length of a fishing line reeled out from a spool of a fishing reel, which comprises a reel main body and the spool around which the fishing line is windable, and comprises: a rotation detector capable of detecting a number of revolutions of the spool relative to the reel main body; a line length calculator that calculates a line length of the reeled out fishing line from the number of revolutions detected by the rotation detector; and a fishing line information setting part that sets fishing line information for the calculation of the line length of the reeled out fishing line by the line length calculator, the fishing line information setting part being configured to enable input of a type of a fishing line to be wound and a line winding diameter (Dmax) of the spool after winding of the fishing line to be wound.

In the line length measuring device according to the embodiment of the present invention, the type of the fishing line to be wound is at least any of a number of the fishing line, a number of pounds of the fishing line, or a thickness (d) of the fishing line.

In the line length measuring device according to the embodiment of the present invention, when the type of the fishing line is set, the fishing line information setting part is configured to display a relationship between the line winding diameter (Dmax) of the spool after winding of the fishing line to be wound and a line length (Lmax) of the wound fishing line after the winding of the fishing line to be wound.

A fishing reel according to one embodiment of the present invention comprises the line length measuring device according to any one of the above.

In the fishing reel, the spool is provided with a mark for determining the line winding diameter (Dmax) of the spool after winding of the fishing line to be wound.

According to the above embodiments, it is possible to provide the line length measuring device, capable of calculating the line length of the reeled out fishing line with less error in an actual use area by utilizing information regarding the line winding diameter and the type of the fishing line without requiring not only input of a line length of the fishing line to be wound and but also measurement of the number of revolutions at the time of winding, and the fishing reel comprising the same.

DETAILED DESCRIPTION

Hereinafter, an embodiment of a line length measuring device and a fishing reel comprising the same according to the present invention will be described in detail with reference to the accompanying drawings. Components common in a plurality of drawings are assigned with the same reference signs throughout the plurality of drawings. It should be noted that each of the drawings is not always illustrated in a precise aspect ratio for the convenience of description.

Figure 1:
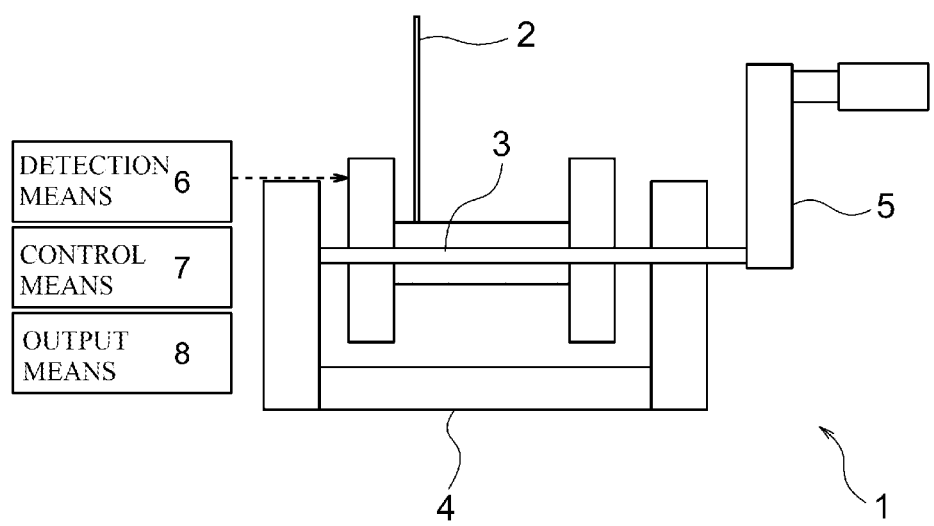
FIG. 1 is a diagram illustrating a basic configuration of a fishing reel according to an embodiment of the present invention.

First, a basic configuration of the fishing reel according to the embodiment of the present invention will be described with reference to FIG. 1. As illustrated in FIG. 1, a fishing reel 1 according to the embodiment of the present invention comprises at least a spool 3 around which a fishing line 2 can be wound, a reel main body 4 that pivotally supports the spool 3 to be rotatable, and an operating part (operating means) 5 that operates the spool 3 to rotate. Further, the fishing reel 1 comprises, as electrical components, a detector (rotation sensor) 6 that detects a relative rotation amount of the spool 3 with respect to the reel main body 4, a controller (control means) 7 that processes a detection result of the detector (rotation sensor) 6, and an output part (output means) 8 that outputs a processing result of the controller (control means) 7. The controller (control means) 7 comprises a line length calculator to be described later, and the output part (output means) 8 is configured to comprise a fishing line information setting part to be described later.

In the fishing reel 1 according to the embodiment of the present invention, the number of the controllers 7 described above is not necessarily one, and a plurality of controllers may be included. At this time, for example, a first controller may be arranged in the fishing reel 1, a second controller may be arranged in an external device (apparatus) such as a smartphone, and communication may be performed between the respective controllers as necessary to perform a part of processing by the second controller. As a result, there is an effect that a calculation cost of the first controller can be suppressed. Further, the second controller of the external device (apparatus) may comprise the line length calculator, and in this case, constitutes a line length calculating and managing system comprising a fishing reel and an external device (apparatus) (details will be described later).

Here, the fishing reel 1 is called a double-bearing reel, and is of a type in which the fishing line is wound as the spool rotates. When a user operates an operating part (operating means) 5 such as a handle, power is transmitted from the operating part (operating means) 5 by a gear or the like, and the spool 3 rotates with respect to the reel main body 4. As a result, the fishing line 2 guided to the reel main body 4 can be wound by the spool 3. Note that a power source at this time may be manually operated by the user, or a motor or a prime mover may be used. Further, the fishing reel 1 may comprise a clutch, a drag, and the like. When a power transmission state of the spool 3 is changed by the clutch, the drag, or the like, the spool 3 can be rotated in a reel-out direction, whereby the fishing line 2 wound around the spool 3 can be reeled out.

The detector (rotation sensor) 6 comprises a detection means (not illustrated) such as an optical sensor or a magnetic sensor, and a detection target means (not illustrated) such as a reflecting plate, a light shielding plate, or a magnet. In order to avoid generation of sliding resistance of the spool 3, a non-contact type detector (detection means) is desirable, but the invention is not limited thereto. When the detector (detection means) is arranged on the reel main body 4 side and a part to be detected (detection target means) is arranged on the spool 3 side, it is possible to easily supply power to the detector (detection means). Further, as the detector (rotation sensor) 6, an incremental type rotation sensor that emits a signal corresponding to a relative rotation amount of the spool 3 may be configured, or an absolute type rotation sensor that emits a signal corresponding to an absolute rotation amount of the spool 3 may be configured. However, in order to calculate the line length of the fishing line, the incremental type has a simpler configuration, which is desirable.

The controller (control means) 7 detects (counts) a rotation signal of the spool 3 from the detector (rotation sensor) 6 to calculate the length of the fishing line (line length) reeled up or reeled out from the spool 3. Details of a calculation method will be described later.

The output part (output means) 8 outputs the calculated length of the fishing line (line length). In the present invention, the output part (output means) 8 is a generic term for means for notifying a length of a fishing line (line length) assuming and aiming at the use of the line length. That is, examples of the output part (output means) 8 include, but are not limited to, a display means such as an LED or an LCD, a sound producing means such as a speaker or an earphone, a storage means such as a built-in memory or a removable medium, a wired communication means or a wireless communication means for transmission to an external apparatus such as a smartphone or a fish flock detector, and the like. Further details of the output part (output means) 8 will be omitted.

The controller 7 and the output part 8 may be built in the reel 1 as described above, or some functions may be achieved in an external device (apparatus) such as a smartphone. The line length calculating and managing system according to an embodiment of the present invention comprises a fishing reel and an external device (apparatus) such as a smartphone configured to be capable of communicating with the fishing reel, and comprises the first controller in the fishing reel and the second controller in the external device (apparatus). The first controller performs processing up to detection and counting of a rotation signal of the spool 3, and transmits the result to the second controller via a known communication means or the like. The second controller calculates a line length by a calculation method to be described later based on the received rotation signal of the spool. The calculated line length is stored by a storage part (means) arranged in the external device (apparatus), and can be output by a display part (means). In this manner, it is possible to reduce calculation resources required for the first controller, and it is possible to reduce a size, a cost, and power consumption of the first controller.

Further, the line length calculating and managing system according to the embodiment of the present invention may be configured such that a setting mode to be described later can be used in the external device (apparatus). As a result, it is unnecessary to newly provide an input means such as a setting button in the fishing reel, and it is possible to reduce a size and a cost of a reel main body. Further, a setting value input in the setting mode in the external device (apparatus) may be shared with the fishing reel by a known communication means or the like. As a result, for example, even in a case where a plurality of external devices (apparatuses) communicate with the fishing reel, an input setting value can be shared by all the external devices (apparatuses) via the fishing reel. Note that role sharing between the first controller and the second controller is not limited to the above method. The same effects can be achieved by a method of performing processing up to the line length calculation in the first controller and performing only the output by the second controller, a method of performing the setting mode by the first controller and performing the line length calculation and the output by the second controller, and the like.

Although the double-bearing reel is taken as an example of the fishing reel 1 in the above description, the present invention is not limited to the double-bearing reel, and can also be applied to a fishing reel of a type called a spinning reel in which a rotor that holds a line guide rotates around a fixed spool to wind a line around the spool. Even in the case of the spinning reel, a length of the wound fishing line (line length) can be calculated by detecting (measuring) a relative rotation amount between the spool and the rotor, and the same effects can be exerted.

Figure 2:
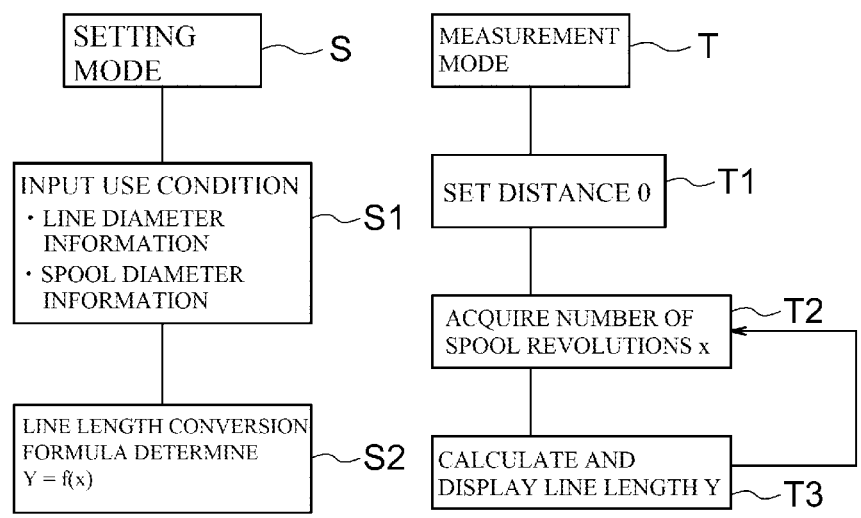
FIG. 2 is a view for describing a method of calculating a length of a fishing line (line length) in a line length measuring device according to the embodiment of the present invention.

Next, a method of calculating the length of the fishing line (line length) in the line length measuring device according to the embodiment of the present invention will be described with reference to FIG. 2. In general, it is convenient if a reel-out line length (Y) of a fishing line can be measured at the time of using a fishing reel. Since a line winding diameter of the fishing line wound around a spool changes with reel-out or winding, the reel-out line length (Y) is not necessarily proportional to a rotation amount X of the spool, and appropriate conversion needs to be performed.

When a change rate of the line winding diameter of the fishing line can be regarded to be constant, such a conversion formula $Y=f(x)$ can be expressed by a quadratic function in the form of $Y=AX^2+BX$ as will be described later (A and B are predetermined constants). At this time, values of the constants A and B may vary depending on a shape of the spool, a thickness of the fishing line in use, and a reel-in length of the fishing line. Therefore, it is necessary to determine these constants also in the general fishing reel. However, the fishing reel according to the embodiment of the present invention has a setting mode (S) for determining two constants of the conversion formula $Y=f(x)$ as illustrated in FIG. 2. In the setting mode (S), two types of information that change according to a use state of the user are input (S1) to determine the unknown constants A and B in the conversion formula (S2). As will be described later, in the embodiment of the present invention, the two types of information are, for example, information regarding a thickness of the line and information regarding a thickness of the spool around which the fishing line has been wound, and information of the detector (rotation sensor) 6 is not necessarily used in the setting mode (S). When the use of the fishing reel is started to enter a measurement mode (T), a rotation amount (number of revolutions) (X) of the spool from a state (T1) in which the distance is 0 m is constantly monitored by the detector (rotation sensor) 6 (T2), and the reel-out line length (Y) of the fishing line is calculated using the conversion formula $Y=f(x)$ determined in the setting mode (T3).

Next, the conversion formula $Y=f(x)$ of the rotation amount (X) of the spool and the reel-out line length (Y) of the fishing line will be further described. Variables at the time of line winding of the fishing line and at the time of use are defined as follows. Here, the time of line winding of the fishing line refers to a preparation state before the start of use of the fishing reel. In this state, line winding around the spool and a setting of fishing line information to be described later are performed (which corresponds to a state in the setting mode (S) of the fishing reel). Further, the time of use refers to a use start state of the fishing reel after completion of the preparation state before the start of use of the fishing reel and a state after the use start state (which corresponds to a state in the measurement mode (T) of the fishing reel).

At the time of line winding: The fishing line having a uniform thickness is wound around the spool having a spool diameter D0 (m) around which no fishing line is wound.

| State | Rotation amount | Line winding diameter (m) | Line length (m) |
|---|---|---|---|
| Initial | 0 | D0 | 0 |
| Intermediate | n | D | L |
| Final | Nmax | Dmax | Lmax |

At the time of use: The fishing line is reeled out by Y (m) from the above final state.

| State | Rotation amount | Line winding diameter (m) | Line length (m) |
|---|---|---|---|
| Before use | 0 | Dmax | 0 |
| During use | X | D | Y |
| Entire line | Nmax | D0 | Lmax |

Figure 3:
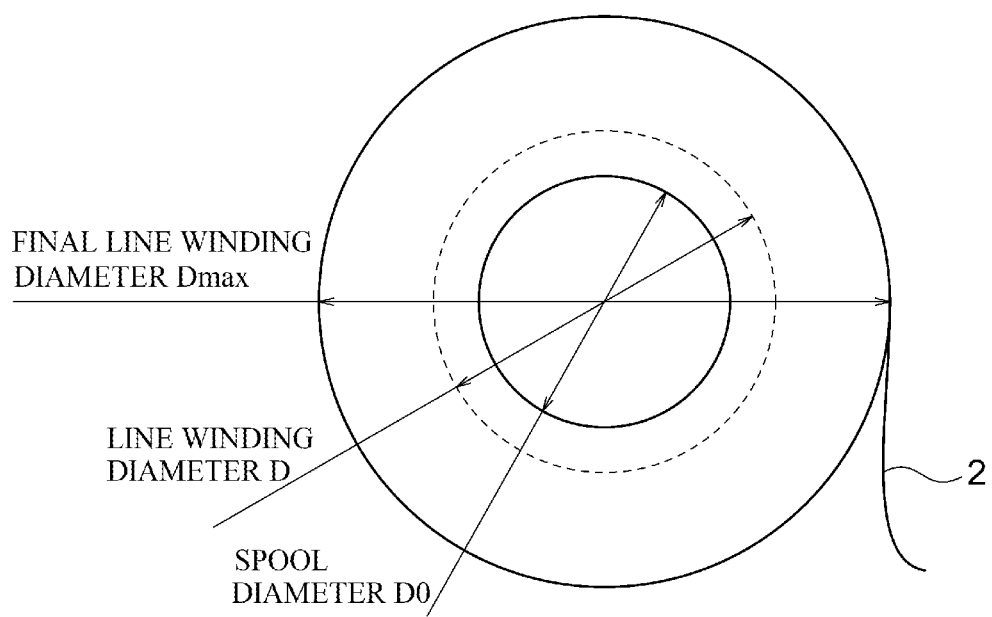
FIG. 3 is a conceptual view of a spool of the fishing reel according to the embodiment of the present invention as viewed from an axial direction.
Figure 4:
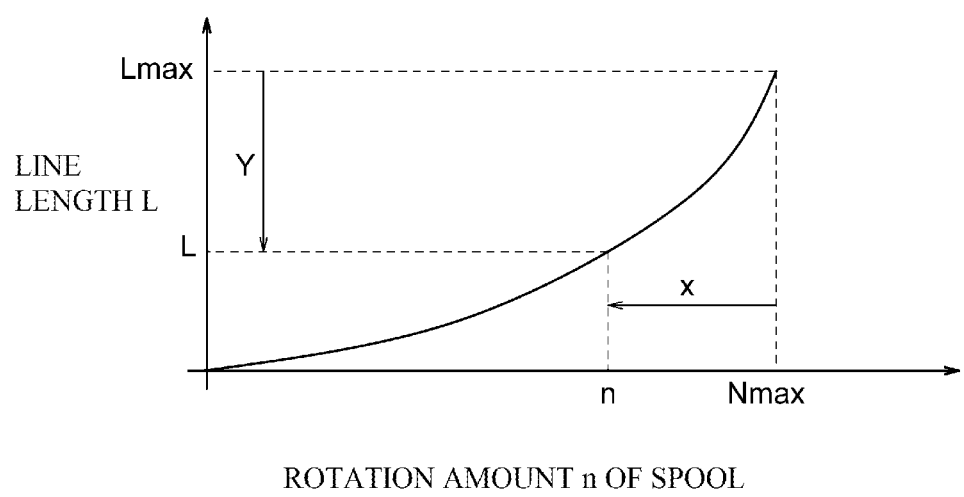
FIG. 4 is a view illustrating a relationship between a line length of a fishing line and a rotation amount of a spool in the line length measuring device according to the embodiment of the present invention.

Next, these will be further described with reference to FIGS. 3 and 4. FIG. 3 is a conceptual view of the fishing reel according to the embodiment of the present invention as viewed from the axial direction of the spool, and FIG. 4 is a graph illustrating the relationship between the line length and the rotation amount of the spool. During use of the fishing reel, as described above, the reel-out line length (Y) of the fishing line can be obtained by measuring the rotation amount (X) of the spool from the use start state and using the conversion formula Y=f (X) to be described later.

In a case where a change amount of the line winding diameter at the time of winding the fishing line around the spool once is defined as ΔD (m) and ΔD (m) can be regarded as a constant value between the time of line winding and the time of use, the following relationship is established.

(Line length)=π×(average line winding diameter)×(rotation amount)

$$L = \pi n (D0 + D)/2 \quad \text{Formula (1)}$$

$$Y = \pi X (D\max + D)/2 \quad \text{Formula (2)}$$

Since the change amount ΔD (m) of the line winding diameter is constant, the following relationship is established.

$$D = D0 + \Delta D n \quad \text{Formula (3)}$$

$$D = D\max - \Delta D X \quad \text{Formula (4)}$$

$$\Delta D = (D\max - D0)/N\max \quad \text{Formula (5)}$$

Then, when Formulas (3) and (4) are put into Formulas (1) and (2), respectively, the following is established.

$$L = \pi n D0 + \pi/2 \times \Delta D \times n^2 \quad \text{Formula (6)}$$

$$Y = \pi X D\max - \pi/2 \times \Delta D \times X^2 \quad \text{Formula (7)}$$

Further, when Nmax, Dmax, and Lmax, which are final states, are put into Formula (1), the following is established.

$$L\max = \pi N\max (D0 + D\max)/2 \quad \text{Formula (8)}$$

From Formulas (5) and (8), ΔD can be expressed as follows using D0, Lmax, and Nmax.

$$\Delta D = 2/(\pi N\max^2)(L\max - \pi D0 N\max) \quad \text{Formula (9)}$$

Then, when Formula (9) is put into Formula (6), the following is obtained.

$$L = \pi n D0 + (\pi/N\max)^2 (L\max - \pi D0 N\max) \quad \text{Formula (10)}$$

Further, a relationship between L and Y, and a relationship between n and X are as follows.

$$L + Y = L\max \quad \text{Formula (11)}$$

$$n + X = N\max \quad \text{Formula (12)}$$

When Formula (10), Formula (11), and Formula (12) are rearranged, the following Formula (13) is obtained.

$$Y = X/N\max(2L\max - \pi D0 N\max) - (X/N\max)^2 (L\max - \pi D0 N\max) \quad \text{Formula (13)}$$

In an example of a conventional fishing reel, a reel-out line length Y of a fishing line is obtained by measuring a rotation amount of a spool by Formula (13). That is, a value of D0 is an eigenvalue of the spool and can be set at the time of factory shipment. A user inputs a line length Lmax to be wound at the time of line winding, and measures a rotation amount Nmax required at that time. These values of D0, Lmax, and Nmax are stored in a microcomputer to sequentially measure a value of the spool rotation amount X, whereby a value of the reel-out line length Y can be calculated.

Figure 5:
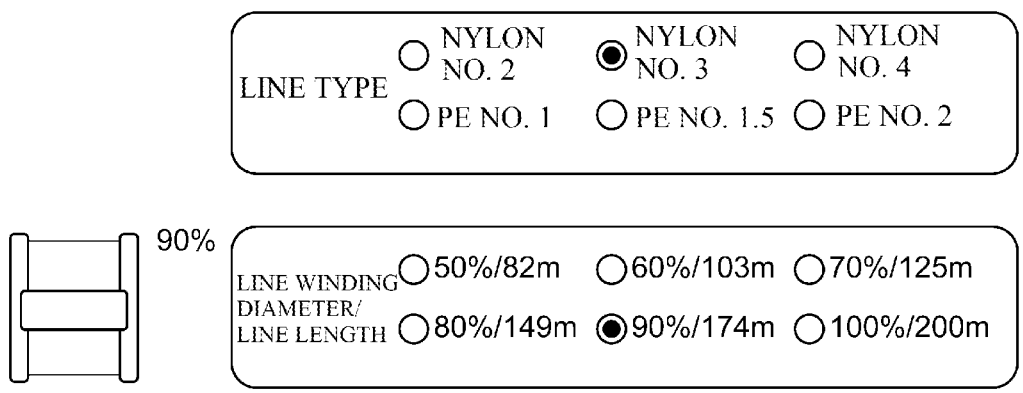
FIG. 5 is a view illustrating an input form in the line length measuring device according to the embodiment of the present invention.

On the other hand, in the fishing reel comprising the line length measuring device according to the embodiment of the present invention, the line length can be calculated by Formula (7). The user sets the line winding diameter (Dmax), which is a final state after line winding work, and a line type to be used in the fishing line information setting part to be described later. As an example, an input form as illustrated in FIG. 5 is prepared. When it is configured to input a ratio of the line winding diameter (Dmax) to a maximum line winding diameter of the spool, it is easy to determine a value of the line winding diameter (Dmax) by eye measurement. For example, when the maximum line winding diameter of the spool is 36 mm and the line is wound up to 90% of the maximum line winding diameter, the controller 7 can calculate as Dmax=36 (mm)×90%=32.4 mm. At this time, when a line winding diameter corresponding to an input condition is displayed in an image or the like in the input form as illustrated in the drawing, a more accurate value can be easily determined. On the other hand, Dmax may be calculated after Lmax is input. That is, a line length reeled out by a predetermined revolution (for example, one revolution of the spool) may be measured and used to calculate Dmax.

Figure 6:
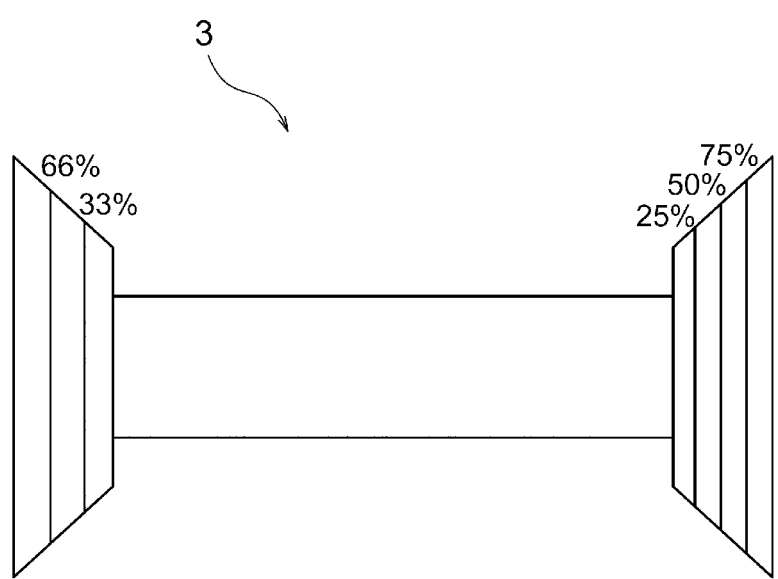
FIG. 6 is a view illustrating a scale (mark) of the spool of the fishing reel according to the embodiment of the present invention.

When a scale (mark) is provided on the spool side as illustrated in FIG. 6, it is easy to determine the value of Dmax. At this time, scales (marks) having different intervals may be provided on the left and right of the spool as illustrated in FIG. 6. As a result, the interval between the scales (marks) can be increased, and the visibility is improved while maintaining the accuracy.

Figure 7:
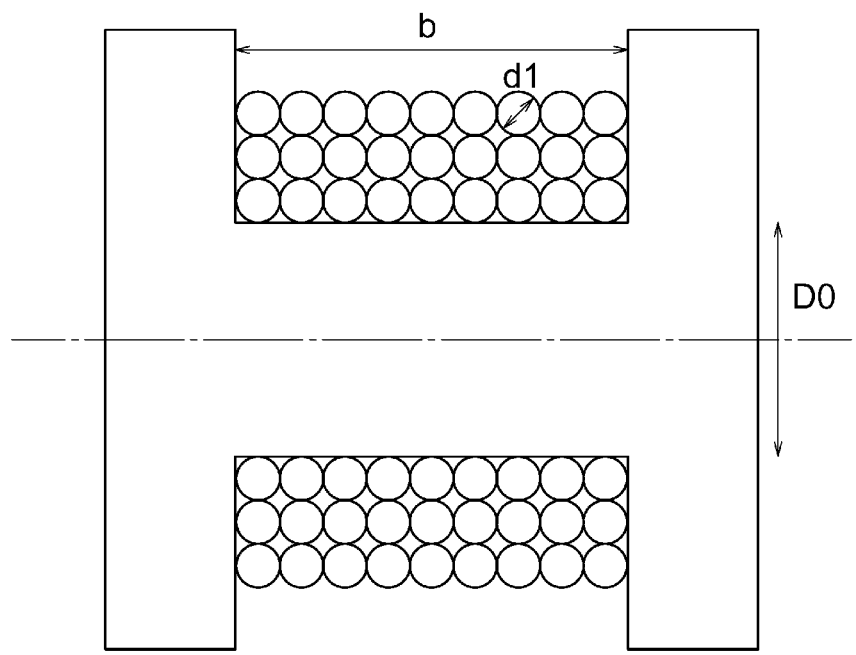
FIG. 7 is a view illustrating a model of line winding around the spool of the fishing reel according to the embodiment of the present invention.

Further, a value of ΔD can be determined by setting a type of the fishing line. A model of line winding around the spool of the fishing reel according to the embodiment of the present invention will be described with reference to FIG. 7. FIG. 7 is a cross-sectional view assuming a case where the fishing line having a line diameter dl (m) is wound around the spool having a rectangular cross-sectional shape and a width b (m) so as to be uniformly arranged (arrayed) in each layer. Based on such a model, the line winding diameter D increases by dl (m) every time winding of b/dl is performed, and thus, the following is established.

$$\Delta D = dl^2 / b \quad \text{Formula (14)}$$

That is, ΔD is proportional to the square of the line diameter and proportional to a cross-sectional area of the fishing line.

A space factor changes since an actual value of ΔD is affected by a change in elongation of the fishing line due to tension variation and an accompanying change in the cross-sectional area, change in a shape, or a change in a line winding state. Further, the cross-sectional shape of the spool is not actually a rectangular shape but a substantially trapezoidal shape in many cases. However, the value of ΔD may be regarded to be constant when the fishing line having the same thickness is wound with a tension within a predetermined range, and it has been found that practically sufficient accuracy can be obtained even if the reel-out amount Y is calculated based on such a model.

A type of a fishing line is customarily displayed in a number proportional to a cross-sectional area of the fishing line or in strength (number of pounds) proportional to a breaking force in many cases. The breaking forces of the fishing line is proportional to the cross-sectional area if the same material is used. Further, if a material of a fishing line is determined, a space factor when the fishing line of the material is wound around a spool is defined to be substantially constant. That is, the value of ΔD is substantially proportional to the number and strength of the fishing line, and thus, is uniquely determined if the type (number and material) of the fishing line is determined. If this relationship is calculated in advance, the value of ΔD can be determined as the user inputs the type of the fishing line. In this manner, in the line length measuring device according to the embodiment of the present invention, the unknown constants of the above-described Formula (7) can be determined by enabling the user to input the value of the line winding diameter (Dmax) and the type of the line, and the reel-out line length Y can be calculated at any time in the line length calculator to be described later.

Figure 8:
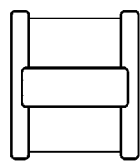
FIG. 8 is a view illustrating an input form after a change in a type of the fishing line in the line length measuring device according to the embodiment of the present invention.
Figure 8:
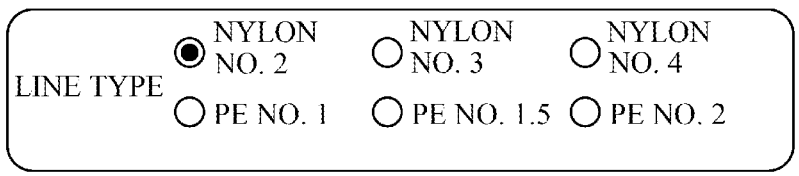
Figure 8:
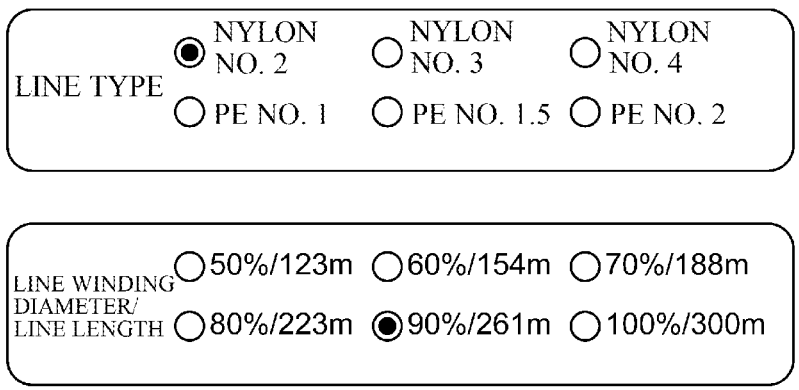
Figure 9:
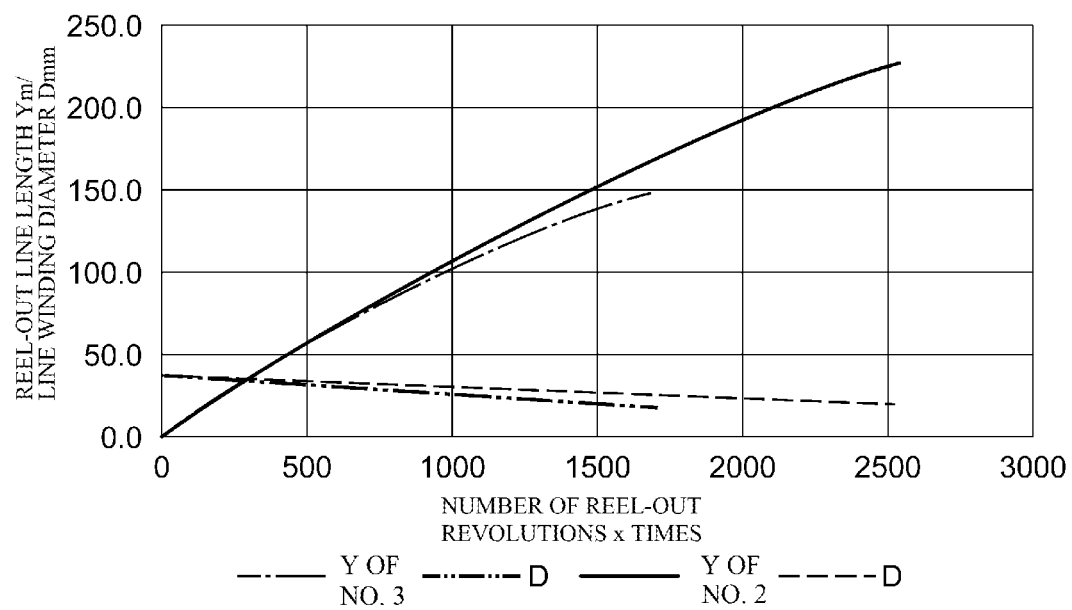
FIG. 9 is a view illustrating a relationship between the number of spool revolutions and a reel-out line length for each line type.

When the type of the fishing line is determined and the value of ΔD is determined, a relationship between the line winding diameter Dmax and the line length Lmax of the fishing line is determined by Formulas (1) and (3). This relationship may be displayed on the input form as illustrated in FIG. 5. In this manner, when the user can grasp the line length Lmax of the wound fishing line, the value of Dmax can be more accurately input. Furthermore, when high breakage (breakage of a line distal end) occurs during use, it is necessary to reset Dmax again in order to maintain the calculation accuracy of the reel-out line length Y. In such a case, however, a length of the line subjected to the high breakage is more easily grasped than a change amount of Dmax in many cases, and thus, a more accurate value can be easily set. That is, in the line length measuring device according to the embodiment of the present invention, the value of the line winding diameter Dmax can be calculated if the line length Lmax of the fishing line can be input instead of the line winding diameter Dmax. FIG. 8 illustrates an example of an input form after the type of the fishing line is changed. Further, FIG. 9 illustrates a relationship between the reel-out line length Y [m] and the number of reel-out revolutions x [times] and a relationship between the line winding diameter D [mm] and the number of reel-out revolutions x [times] when two types of fishing lines (Nos. 2 and 3) having different thicknesses are wound up to Dmax=36 m as an example. Between the respective fishing lines, values of ΔD in Formulas (4) and (7) are different by 1.5 times. Therefore, in the relationship indicating the line winding diameter D, an intercept of the reel-out line length Y is common, and inclinations are different by 1.5 times. In the relationship with the reel-out line length Y, an inclination around x=0 is common, and curvature differently change as the number of reel-out revolutions x increases.

Figure 12:
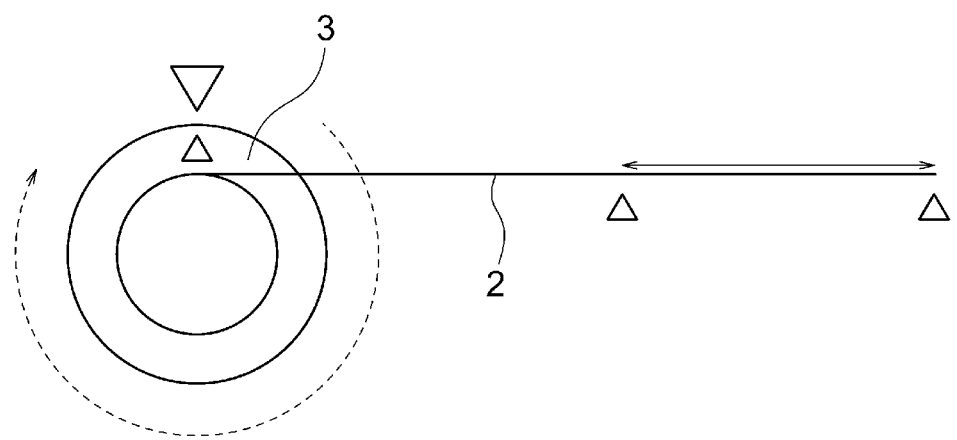
FIG. 12 is a view for describing a method of calculating a reel-out line length of the fishing line in the line length measuring device according to the embodiment of the present invention.

Another method will be described regarding an input method of the line winding diameter (Dmax) in the line length measuring device according to the embodiment of the present invention. In order to obtain the line winding diameter (Dmax), a reel-out line length of the fishing line when the spool is rotated by a predetermined revolution (for example, one revolution) may be detected (measured) other than the direct detection (measurement) of the diameter of the spool Details of the input method of the line winding diameter (Dmax) in the line length measuring device according to the embodiment of the present invention will be described with reference to FIG. 12. Each of the spool 3 and the reel main body 4 of the fishing reel 1 according to the embodiment of the present invention is provided with a mark, and the user rotates the spool once with the mark as a guide. A reel-out line length at that time is detected (measured) with a ruler or the like, and the value thereof is input to a setting value. For example, when the reel-out line length is 10 cm, the spool diameter Dmax at that time can be calculated as 10/π≈3.18 cm.

Figure 13A:
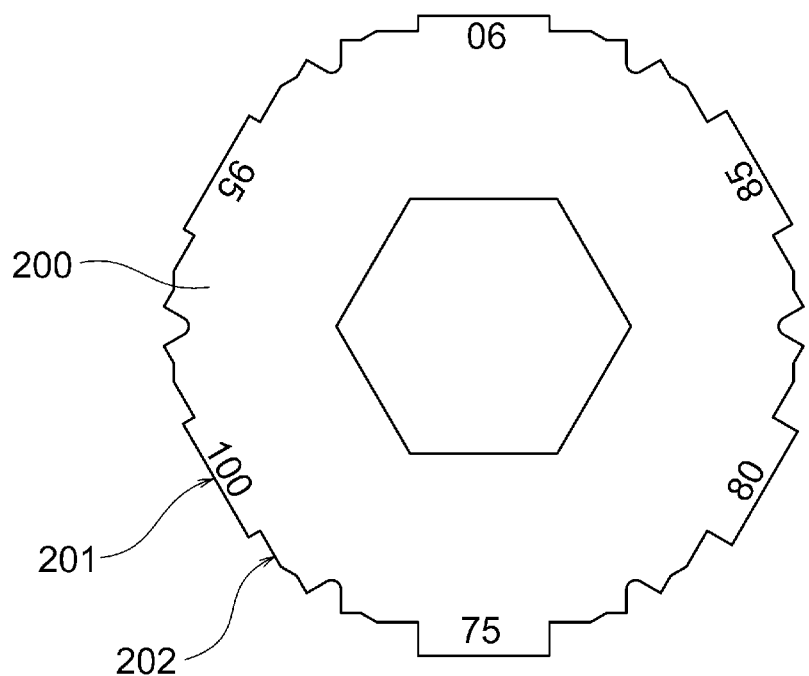
FIG. 13A is a view illustrating a line diameter measuring gauge according to the embodiment of the present invention.
Figure 13B:
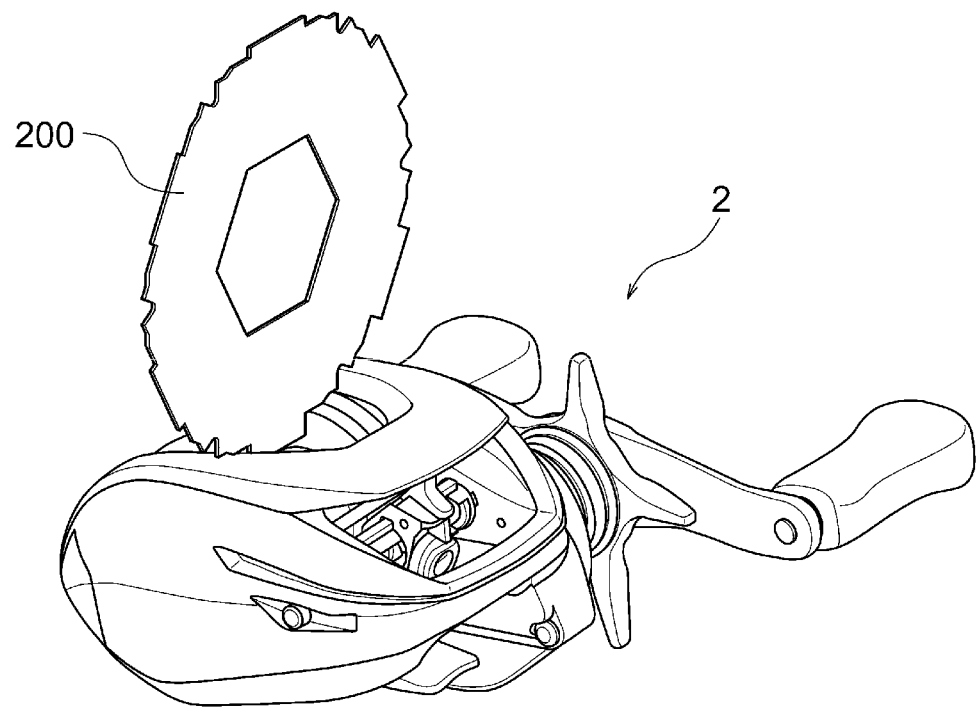
FIG. 13B is a view for describing a method of calculating a reel-out line length of the fishing line in the line length measuring device according to the embodiment of the present invention.

As another example, an example using a gauge will be described with reference to FIGS. 13A and 13B. In the present embodiment, a line diameter measuring gauge 200 as illustrated in FIG. 13A is used. The line diameter measuring gauge 200 has a substantially N-sided (hexagonal in the present example) shape, and includes a line abutment portion 201 and a reel abutment portion 202 on each side. All the N reel abutment portions 202 have the same shape, and the reel abutment portion 202 is placed to abut against a predetermined position of the reel and used as illustrated in FIG. 13B. The N line abutment portions 201 are formed such that a distance from the center gradually changes, and line winding diameters (Dmax) (in the present embodiment, expressed as percentages) are described. It is sufficient for the user just find a place where the reel abutment portion 202 and the line abutment portion 201 hit the fishing reel 1 substantially at the same time by causing each of the line abutment portions 201 to abut on an outer surface of the wound fishing line of the fishing reel 1, and input the value thereof as a setting value.

A line length measuring device according to one embodiment of the present invention is a line length measuring device capable of measuring a line length of a fishing line reeled out from a spool of a fishing reel, which comprises a reel main body and the spool around which the fishing line is windable, and comprises: a rotation detector capable of detecting a number of revolutions of the spool relative to the reel main body; a line length calculator that calculates a line length of the reeled out fishing line from the number of revolutions detected by the rotation detector; and a fishing line information setting part that sets fishing line information for the calculation of the line length of the reeled out fishing line by the line length calculator, the fishing line information setting part being configured to enable input of a type of a fishing line to be wound and a line winding diameter (Dmax) of the spool after winding of the fishing line to be wound.

With the line length measuring device according to the embodiment of the present invention, it is possible to provide the line length measuring device capable of calculating the line length of the reeled out fishing line with less error in an actual use area by utilizing information regarding the line winding diameter and the type of the fishing line without requiring not only input of a line length of the fishing line to be wound and but also measurement of the number of revolutions at the time of winding.

In the line length measuring device according to the embodiment of the present invention, the type of the fishing line to be wound is at least any of a number of the fishing line, a number of pounds of the fishing line, or a thickness (d) of the fishing line.

In the line length measuring device according to the embodiment of the present invention, when the type of the fishing line is set, the fishing line information setting part is configured to display a relationship between the line winding diameter (Dmax) of the spool after winding of the fishing line to be wound and a line length (Lmax) of the wound fishing line after the winding of the fishing line to be wound.

A fishing reel according to one embodiment of the present invention comprises the line length measuring device according to any one of the above.

With the fishing reel according to the embodiment of the present invention, it is possible to provide the fishing reel comprising the line length measuring device capable of calculating the line length of the reeled out fishing line with less error in an actual use area by utilizing information regarding the line winding diameter and the type of the fishing line without requiring not only input of a line length of the fishing line to be wound and but also measurement of the number of revolutions at the time of winding.

In the fishing reel according to the embodiment of the present invention, the spool is provided with a scale (mark)

for determining the line winding diameter (Dmax) of the spool after winding of the fishing line to be wound.

Technical effects obtained by the line length measuring device according to the embodiment of the present invention and the fishing reel comprising the same will be described in more detail. As described above, the conventional method requires input of values of Nmax and Lmax. For this reason, the user needs to grasp the line length Lmax of the wound fishing line, there is a case where it is practically difficult for the user to grasp the line length Lmax of the fishing line such as a case where a colorless uniform fishing line is wound. Further, in the conventional fishing reel, work for detecting (measuring) the rotation amount Nmax of the spool necessary for winding of the fishing line is required in the setting mode, but there is also a problem that this work is troublesome. That is, it is necessary to perform the following procedure in order to input the rotation amount Nmax of the spool.

Entering the setting mode→performing an input start operation→connecting the fishing line to the spool and operating the operating means to wind the fishing line around the spool→performing a setting end operation However, in the course of such a series of operations, there is also a problem that it is difficult to perform resetting when the resetting is required during fishing due to a failure in a setting operation, line breakage, or the like.

On the other hand, in the line length measuring device according to the embodiment of the present invention and the fishing reel comprising the same, it is sufficient to input the line winding diameter (Dmax) of the spool in the final state after the line winding and the type of the wound fishing line, and it is unnecessary to input the line length (Lmax) and the rotation amount (Nmax) of the spool in the setting mode, and thus, it is easy to make a determination from the final state by eye measurement. Therefore, work required by the user can be greatly simplified. Further, even when the necessity of resetting occurs such as a case where the line breakage occurs in the fishing line while the user is fishing, the resetting can be easily and reliably performed on the spot if the user grasps a length of the broken fishing line. Furthermore, in the conventional method, special work is required because a value of DO or Nmax change in a case where a different line is wound around the inner peripheral side of a fishing line to be used at the time of use, which is called pre-winding. However, in the line length measuring device according to the embodiment of the present invention and the fishing reel comprising the same, the line winding diameter (Dmax) in the final state is input, and the information on DO side is unnecessary, and thus, the same input method can be used regardless of the presence or absence of pre-winding.

Further, in the line length measuring device according to the embodiment of the present invention and the fishing reel comprising the same, a large error is less likely to occur in the actual use area if a value of the line winding diameter (Dmax) is not wrong. FIG. 9 illustrates a relationship between the number of spool revolutions (X) and the reel-out line length (Y) for each line type. When a value of the number of spool revolutions (X) is small, an influence of the primary term of the number of spool revolutions (X) on the above-described Formula (7) is great, and an influence of the above-described Formula (2) increases as the number of spool revolutions (X) increases. As a general use method in the fishing reel, an outer peripheral portion of the wound fishing line is used more frequently. That is, an area where the number of spool revolutions (X) is large is often considered as a reserve for a trouble such as high breakage, and an area where the number of spool revolutions (X) is small is used more frequently. Since a coefficient of the primary term having the large influence in this area is the line winding diameter (Dmax), the input accuracy of the line winding diameter (Dmax) becomes the calculation accuracy of the reel-out line length (Y) almost as it is. For example, when a maximum diameter of the spool is 36 mm, a gap between the wound line and an outer edge of the spool can be relatively easily grasped even by eye measurement. Assuming that an error at this time is 1 mm, the calculation accuracy of the reel-out line length (Y) becomes $\frac{1}{36} \approx 3\%$, and not only input is easy but also practically sufficient calculation accuracy can be obtained.

In the above description, the reel-out line length (Y) is calculated as a quadratic expression of the number of spool revolutions (X), but the line length measuring device according to the embodiment of the present invention and the fishing reel comprising the same are not limited thereto. Other conversion formulas may be used according to a shape of the spool. For example, if a shape is a so-called shallow groove spool in which a ratio between a minimum diameter and a maximum diameter of the spool is small, an influence of the quadratic term of the above-described Formula (7) is relatively small, and thus, practically sufficient accuracy is often obtained even when approximation is performed by a linear expression. Further, if a cross-sectional shape of the spool is a shape closer to a triangle than a rectangle, ΔD cannot be regarded to be constant, and thus, it may be difficult to obtain practically sufficient accuracy unless the reel-out line length (Y) is approximated by a cubic or higher order expression of the number of spool revolutions (X). In any case, the relational expression between the number of spool revolutions (X) and the reel-out line length (Y) can be determined by inputting the line winding diameter (Dmax) and the line type similarly to the method described above, and the same effects can be achieved.

A line length calculating and managing system according to an embodiment of the present invention comprises: a fishing reel and an external device configured to be capable of communicating with the fishing reel. The fishing reel comprises: a reel main body; a spool around which a fishing line is windable; a rotation detector capable of detecting a number of revolutions of the spool relative to the reel main body; a fishing line information setting part that sets fishing line information for calculation of a line length of a reeled out fishing line performed by the line length calculator; and a transmitter that transmits the number of revolutions detected by the rotation detector and the fishing line information to the external device. The fishing line information setting part is configured to enable input of a type of a fishing line to be wound and a line winding diameter (Dmax) of the spool after the winding of the fishing line to be wound. The external device comprises: a receiver that receives the number of revolutions detected by the rotation detector and the fishing line information from the fishing reel; a line length calculator that calculates the line length of the reeled out fishing line based on the number of revolutions and the fishing line information; and a display part that outputs the calculated line length. In this manner, the line length calculating and managing system is configured to be capable of calculating the line length of the fishing line reeled out from the spool of the fishing reel by the external device and outputting the calculated line length.

Figure 10:
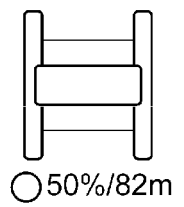
FIG. 10 is a view illustrating another example of the input form in the line length measuring device according to the embodiment of the present invention.
Figure 10:
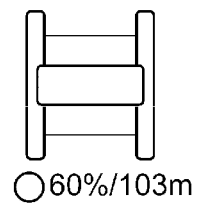
Figure 10:
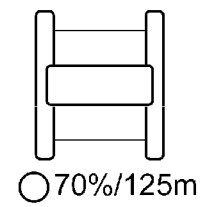
Figure 10:
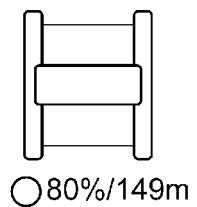
Figure 10:
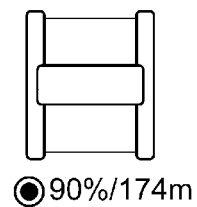
Figure 10:
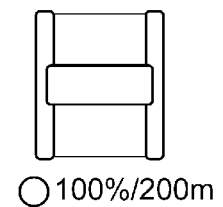
Figure 11:
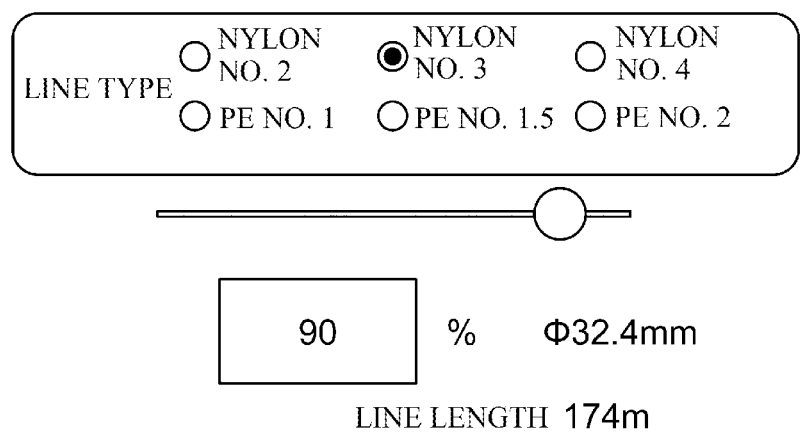
FIG. 11 is a view illustrating still another example of the input form in the line length measuring device according to the embodiment of the present invention.

Next, other examples of the input form in the line length measuring device according to the embodiment of the present invention will be described with reference to FIGS. 10 and 11. As illustrated in FIG. 10, an illustration or a photograph of the spool according to a final line winding diameter may be displayed to allow the user to select. As a result, the user can intuitively grasp and input a value of the line winding diameter (Dmax). As illustrated in FIG. 11, the user may input a value of the line winding diameter (Dmax). As a result, the value of the line winding diameter (Dmax) can be accurately and easily input, and thus, the display accuracy of the reel-out line length (Y) can be improved.

Dimensions, materials, and arrangements of the components described in this specification are not limited to those explicitly described in the embodiments, and the components may be modified to have any dimensions, materials, and arrangements that may fall within the scope of the present invention. Further, components not explicitly described herein can be added to the described embodiments, or some of the components described in each embodiment can be omitted.

REFERENCE SIGNS LIST 1 fishing reel
2 fishing line
3 spool
4 reel main body
5 operating part (operating means)
6 detector (rotation sensor)
7 controller (control means)
8 output part (output means)
10 line length measuring device
200 line diameter measuring gauge
201 line abutment portion
202 reel abutment portion

What is claimed is:

1. A line length measuring device capable of measuring a line length of a fishing line reeled out from a spool of a fishing reel, which comprises a reel main body and the spool around which the fishing line is windable, the line length measuring device comprising:

a rotation detector capable of detecting a number of revolutions of the spool relative to the reel main body;
a line length calculator that calculates a line length of the reeled out fishing line; and
a fishing line information setting part that sets fishing line information for the calculation of the line length of the reeled out fishing line by the line length calculator,
wherein the fishing line information setting part is configured to enable input of a type of a fishing line to be wound and a line winding diameter (Dmax) of the spool after winding of the fishing line to be wound, and
wherein the line length calculator is configured to calculate the line length of the reeled out fishing line based on (i) the number of revolutions of the spool detected by the rotation detector, (ii) the type of the fishing line to be wound that is input in the fishing line information setting part; and (iii) the value of the line winding diameter (Dmax) that is input in the fishing line information setting part.

2. The line length measuring device according to claim 1, wherein the type of the fishing line to be wound is at least any of a number of the fishing line, a number of pounds of the fishing line, or a thickness (d) of the fishing line.

3. The line length measuring device according to claim 1, wherein the fishing line information setting part is configured to display, when the type of the fishing line is set, a relationship between the line winding diameter (Dmax) of the spool after winding of the fishing line to be wound and a line length (Lmax) of the wound fishing line after the winding of the fishing line to be wound.

4. The fishing reel comprising the line length measuring device according to claim 1.

5. The fishing reel according to claim 4, wherein the spool is provided with a mark for determining the line winding diameter (Dmax) of the spool after winding the fishing line to be wound.

* * * * *